(12) United States Patent
Hoerpel et al.

(10) Patent No.: US 7,525,788 B2
(45) Date of Patent: Apr. 28, 2009

(54) CAPACITOR COMPRISING A CERAMIC SEPARATING LAYER

(75) Inventors: Gerhard Hoerpel, Nottuln (DE); Volker Hennige, Duelmen (DE); Chistian Hying, Rhede (DE); Sven Augustin, Dorsten (DE)

(73) Assignee: Degussa AG, Duesseldorf (DE)

( * ) Notice: Subject to any disclaimer, the term of this patent is extended or adjusted under 35 U.S.C. 154(b) by 178 days.

(21) Appl. No.: 10/575,734

(22) PCT Filed: Aug. 19, 2004

(86) PCT No.: PCT/EP2004/051845

§ 371 (c)(1),
(2), (4) Date: Apr. 13, 2006

(87) PCT Pub. No.: WO2005/038833

PCT Pub. Date: Apr. 28, 2005

(65) Prior Publication Data

US 2007/0139860 A1 Jun. 21, 2007

(30) Foreign Application Priority Data

Oct. 14, 2003 (DE) .............................. 103 47 568

(51) Int. Cl.
*H01G 9/00* (2006.01)
(52) U.S. Cl. ..................... 361/503; 361/505
(58) Field of Classification Search .......... 361/503–505
See application file for complete search history.

(56) References Cited

U.S. PATENT DOCUMENTS

| | | | | |
|---|---|---|---|---|
| 4,713,731 A * | 12/1987 | Boos et al. ................... | 361/502 |
| 5,748,439 A * | 5/1998 | MacFarlane et al. ........ | 361/525 |
| 6,094,338 A * | 7/2000 | Hirahara et al. ............. | 361/502 |
| 6,299,778 B1 | 10/2001 | Penth et al. | |
| 6,309,545 B1 | 10/2001 | Penth et al. | |
| 6,340,379 B1 | 1/2002 | Penth et al. | |
| 6,383,386 B1 | 5/2002 | Hying et al. | |
| 6,585,152 B2 | 7/2003 | Farahmandi et al. | |
| 6,620,320 B1 | 9/2003 | Hying et al. | |
| 6,638,988 B2 * | 10/2003 | Takata et al. ................ | 521/143 |
| 6,841,075 B2 | 1/2005 | Penth et al. | |
| 7,351,494 B2 | 4/2008 | Hennige et al. | |
| 2002/0039648 A1 | 4/2002 | Horpel et al. | |
| 2002/0045091 A1* | 4/2002 | Kamei et al. ................... | 429/62 |
| 2002/0148723 A1* | 10/2002 | Takata et al. ................. | 204/252 |
| 2003/0062257 A1* | 4/2003 | Gozdz ......................... | 204/252 |
| 2003/0180622 A1* | 9/2003 | Tsukuda et al. ............. | 429/249 |
| 2004/0028913 A1 | 2/2004 | Hennige et al. | |
| 2004/0038105 A1 | 2/2004 | Hennige et al. | |
| 2005/0031942 A1 | 2/2005 | Hennige et al. | |
| 2005/0070193 A1 | 3/2005 | Hennige et al. | |
| 2005/0084761 A1 | 4/2005 | Hennige et al. | |
| 2005/0087491 A1 | 4/2005 | Hennige et al. | |
| 2005/0221165 A1 | 10/2005 | Hennige et al. | |
| 2005/0221192 A1 | 10/2005 | Hennige et al. | |
| 2005/0255769 A1 | 11/2005 | Hennige et al. | |
| 2006/0024569 A1 | 2/2006 | Hennige et al. | |
| 2006/0046138 A1 | 3/2006 | Hennige et al. | |
| 2006/0078791 A1 | 4/2006 | Hennige et al. | |
| 2006/0166085 A1 | 7/2006 | Hennige et al. | |

FOREIGN PATENT DOCUMENTS

| | | |
|---|---|---|
| DE | 198 38 800 | 3/2000 |
| DE | 101 42 622 | 3/2003 |
| DE | 102 08 277 | 9/2003 |
| EP | 1 202 299 | 5/2002 |
| JP | 2000331663 A * | 11/2000 |
| WO | 99/15262 | 4/1999 |
| WO | 99/57769 | 11/1999 |
| WO | 01/13388 | 2/2001 |
| WO | 01/88934 | 11/2001 |
| WO | WO03/021697 A2 * | 3/2003 |
| WO | WO03/073534 A2 * | 9/2003 |

OTHER PUBLICATIONS

U.S. Appl. No. 10/519,097, filed Dec. 27, 2004, Hennige et al.
Washburn, Edward W. , "Note on a Method of Determining the Distribution of Pore sizes in a Porous Material", Physics, vol. 7, pp. 115-116, 1921.
Haskell, D. K. et al., "Electrostatic Capacitive Energy Storage", Encyclopedia of Applied Physics, vol. 6, pp. 155-176, 1993.
Winnacker-Kuechler "Chemische Technologie", Organische Technologie III, vol. 7, pp. 92-97, 1986.

(Continued)

*Primary Examiner*—Eric Thomas
(74) *Attorney, Agent, or Firm*—Oblon, Spivak, McClelland, Maier & Neustadt, P.C.

(57) ABSTRACT

An electrochemical capacitor including a separating layer on a support. The separating layer represents a porous inorganic, electrically non-conducting coating which is provided with particles of compounds of the elements Al, Si, and/or Zr, the particles being bonded to each other and to the support by an inorganic adhesive. The support can represent a porous electrode or a porous and planar substrate that is provided with polymer fibers.

16 Claims, No Drawings

OTHER PUBLICATIONS

Mastragostino, Marina et al., "Electrochemical Supercapacitors", Academic/Plenum Publishers, pp. 481-505, 2002.
Koetz, R. et al., "Principles and applications of electrochemical capacitors", Electrochimical Acta, vol. 45, pp. 2483-2498, 2000.
Meffert, A. et al., "Fast method for determining the surface area of fine solids", pp. 187-193, 1967.(with English Translation).
U.S. Appl. No. 10/575,759, filed Apr. 13, 2006, Hennige et al.
U.S. Appl. No. 10/575,268, filed Apr. 11, 2006, Hennige et al.
U.S. Appl. No. 10/575,274, filed Apr. 11, 2006, Hennige et al.
U.S. Appl. No. 11/577,542, filed Apr. 19, 2007, Hoerpel et al.
U.S. Appl. No. 11/578,664, filed Oct. 18, 2006, Hoerpel et al.
U.S. Appl. No. 10/588,952, filed Aug. 10, 2006, Nun et al.
U.S. Appl. No. 11/917,914, filed Dec. 18, 2007, Holzapfel et al.
U.S. Appl. No. 12/063,626, filed Feb. 12, 2008, Hying et al.
U.S. Appl. No. 12/021,436, filed Jan. 29, 2008, Pascaly et al.
U.S. Appl. No. 12/066,146, filed Mar. 7, 2008, Schormann et al.

* cited by examiner

CAPACITOR COMPRISING A CERAMIC SEPARATING LAYER

The present invention relates to a capacitor which comprises a ceramic separating layer.

Conventional capacitors store electrical energy on two mutually opposite capacitor plates which are separated by a dielectric. There are different types:

1. Wound capacitors: the metal plates in wound capacitors are firmly wound up with a tape dielectric to form a wound coil. The wound coil is usually accommodated in a metallic can and sealed off with a potting compound to guard against moisture.
2. Paper capacitors: here the dielectric is formed by two or more plies of cellulose paper. The metallic plates are formed by aluminum foils. The connection wires have been welded onto thin metal sheets, which are included in the wound coil.
3. Film capacitors: their dielectric is composed of plastics films such as polypropylene, polyester or polycarbonate. In the case of film/foil capacitors, the metal plates are aluminum foils. In the case of metalized film capacitors, the metal plates are coatings formed by vapor depositions on the plastic films.
4. Electrolytic capacitors: their dielectric is a thin oxidic layer. This makes it possible to fabricate small capacitors having large capacities.
5. Ceramic capacitors: their dielectric is a ceramic material. Small-scale ceramic capacitors are constructed as tubular and disk capacitors.

Electrochemical capacitors (ECs), also known as supercapacitors or ultracapacitors, store energy in the electric field of the electrochemical double layer. Applications involving an extremely large capacity are met using porous electrodes having a very large surface area. State of the art ECs cover the range between conventional capacitors (high power density, low energy density) and batteries or fuel cells (low power densities, high energy densities). The state of the art is surveyed in R. Kötz et al (Electrochimica Acta 45 (2000), 2483ff) and M. Mastragostino et al (Advances in Lithium-Ion Batteries, Kluwer Academic New York (2002), pages 481 to 505). Various types of electrochemical capacitors are distinguished in principle:

1. Double-layer capacitors: "classic" variant, where the electric energy is stored in an electric double layer on the electrode surface. A typical electrode material here is graphite (natural, artificial, nanotubes, . . . ) having very, large surface areas of up to 2500 $m^2/g$.
2. Polymeric capacitors: pseudo-capacitor behavior by virtue of p- and n-doping in polymers having conjugated π-electron systems.
3. Metal oxide capacitors: likewise pseudo-capacitor behavior by virtue of fast, reversible Faradic protonation of electrode surface. The typical electrode material here is $RuO_2$ in an acidic electrolyte.

A porous separator keeps the electrodes mechanically separated in electrochemical capacitors. The electrolyte comprises aqueous or nonaqueous solvents together with a suitable conducting salt. Polymeric membranes are used as separators in aqueous systems, while paper or a polyolefin, such as for example polyethylene (PE) or polypropylene (PP), are used as separators in nonaqueous systems. These separators exhibit low thermal stability, which is why simple welding is not possible for cell assembly and, secondly, the separator will melt or decompose when the capacitor gets too hot in operation, which results in destruction of the capacitor.

It is an object of the present invention to provide a capacitor which has superior thermal stability and is simple to produce.

It has now been found that, surprisingly, the use of ceramic separating layers on carriers as separators improves the thermal stability of capacitors and such separating layers are simple to produce. The separating layers can be applied both to electrodes as carriers (separator electrode unit) or else to carriers comprising polymeric fibers. These various ways of producing the separating layer make it possible for the capacitor of the present invention to be produced by adding few if any modifications to the usual hitherto customary manufacturing operations for capacitors.

Traditionally, a separator for electrochemical capacitors is a thin porous electroinsulating material possessing high ion perviousness, good mechanical strength and long-term stability to the chemicals and solvents used in the system, for example in the electrolyte of the electrochemical cell. The separator in an electrochemical cell shall provide complete electronic insulation of the cathode from the anode.

Separators used at present consist predominantly of porous organic polymeric films or other organic or inorganic nonwoven materials, such as papers for example. These are produced by various companies. Important producers here are: Celgard, Tonen, Ube, Asahi, Binzer, Mitsubishi, Daramic and others.

Most separators lack mechanical stability and tend to lead to short circuiting, with the result that it is impossible to achieve a long use life. A substantial disadvantage of organic polyolefinic separators is their low thermal stability limit of below 150° C. Even brief attainment or exceedance of the melting point of these polymers leads to substantial melting of the separator and to destruction of the capacitor. The use of such separators is therefore in general not safe, since these separators and hence the capacitors are destroyed on attainment of higher temperatures, especially of above 150° C. or even 180° C. Moreover, polyolefinic separators are extremely apolar. But since the electrolytes used are mostly very polar, substantial wetting problems occur. This leads to extremely long fill times of the capacitors with the electrolyte and also to a very limited choice of usable electrolytes.

Separators comprising ceramic coatings on various substrates have recently been developed in the field of battery separators. For instance, DE 198 38 800 C1 proposes an electrical separator having a compositic structure that comprises a sheetlike, flexible substrate which has a multiplicity of openings and supports a coating. The material for the substrate is selected from metals and the coating is an uninterrupted porous nonelectroconductive ceramic coating. The use of a ceramic coating promises thermal and chemical stability. The separators, which as exemplified comprise a carrier or substrate composed of electrically conducting material, however, have been determined to be unsuitable for electrochemical cells, since the coating has proved impossible to produce over a large area without defects at the thickness described. Short circuiting accordingly occurs very readily. Moreover, such thin woven metal fabrics as required for very thin separators are not commercially available.

DE 101 42 622 showed that a material which comprises a sheetlike, flexible substrate which has a multiplicity of openings and supports a coating present on and in this substrate, the material of the substrate having been selected from woven or non-woven nonelectroconductive fibers of glass or ceramic or a combination of such materials and the coating being a porous electroinsulating ceramic coating and the resulting battery separator being less than 100 µm in thickness and bendable, can be used to produce a battery separator which in conjunction with the electrolyte has a sufficiently low resistance and yet has a sufficiently large long-term stability. DE 102 08 277 reduced the weight and the thickness of the battery separator for lithium high energy batteries by utilizing a polymeric nonwoven.

That the separators described there are also useful in capacitors, especially in capacitors without aqueous electrolytes, however, has hitherto been neither recognized nor described. The present invention therefore resides in the use of separators in capacitors which comprise a separating layer on a porous carrier, wherein the separating layer is a porous inorganic nonelectroconductive coating which comprises particles of the elements Al, Si and/or Zr that are adhered to each other and to the carrier by an inorganic adhesive.

The present invention accordingly provides a capacitor which comprises a separating layer, characterized in that the separating layer is present on a carrier, preferably a porous carrier, and is a porous inorganic nonelectroconductive coating which comprises particles of compounds of the elements Al, Si and/or Zr that are adhered to each other and to the carrier by an inorganic adhesive, and also for its use as a store for electrical energy, for example for use in vehicles.

The separators according to the present invention have the advantage of being very readily wettable by organic polar solvents in particular and, especially, of possessing good thermal stability. Owing to thermal stability, not only is capacitor assembly simpler (welding), but also the separator will not melt or decompose in the event that a cell gets too hot in operation. Especially a stack of capacitors that is needed to achieve higher voltages becomes distinctly more outage-resistant as a result.

Owing to the better wettability of separators according to the present invention, the electrochemical cell can be filled with electrolyte very rapidly. This shortens capacitor manufacturing time appreciably. Moreover, it is now also possible to use many other solvents which are difficult or impossible to use together with polyolefinic separators.

The construction of capacitors and also the production thereof is discernible for example from EP 1 202 299, U.S. Pat. No. 6,585,152, EP 1 314 174 and EP 1 212 763. More particularly, capacitor construction and functioning is discernible from the contribution of D. K. Haskell, A. C. Kolb and W. G. McMillan in Encyclopedia of Applied Physics, Volume 6, pages 155 to 176, VCH Publishers New York, 1993 and the references cited therein.

The capacitor according to the present invention and a process for producing the separating layer present therein will now be described without wishing to restrict the invention to these embodiments.

The capacitor according to the present invention, which comprises a (ceramic) separating layer, is characterized in that the separating layer is present on a carrier, preferably a porous carrier, and is adhered thereto and is a porous inorganic nonelectroconductive coating which comprises particles of compounds of the elements Al, Si and/or Zr, especially oxidic particles of these elements, that are adhered to each other an to the carrier by an inorganic adhesive.

The inorganic adhesive in the separating layer in the capacitor according to the present invention is preferably selected from oxides of the elements Al, Si and/or Zr. The inorganic adhesive may for example comprise particles having an average particle size of less than 20 nm and have been produced via a particulate sol or an inorganic network of the oxides which was produced via a polymeric sol.

It can be advantageous for the separating layer to further comprise an inorganic network comprising silicon, the silicon of the network being bonded via oxygen atoms to the oxides of the inorganic coating and via an organic radical to the carrier which comprises polymeric fibers. Such a network is obtained when an adhesion promoter is used in the production of the separating layer and this adhesion promoter is subjected to the thermal treatment customary for the production process.

Depending on the type of capacitor, the separating layer can comprise oxidic particles of the elements Al, Si and/or Zr in different sizes. Preferably, capacitors according to the present invention comprise a separating layer which comprise particles having an average particle size in the range from 0.5 to 10 µm and preferably from 1 to 5 µm. But larger and smaller particle sizes are also conceivable, depending on the carrier used. It is particularly preferable for the particles to be adhered using an oxide of the metals Zr or Si. The separating layer ceramic material formed via the particles and the inorganic adhesive, in the capacitor according to the present invention, preferably has an average pore size in the range from 50 nm to 5 µm and more preferably in the range from 80 nm to 800 nm.

The separating layer present in the capacitor according to the present invention may be present on a very wide variety of carriers. In a preferred embodiment, the separating layer is present on a carrier which comprises fibers of polymers, glass and/or ceramic, polymeric fibers being preferred. With this embodiment of the capacitor according to the present invention, the separating layer can be present on or on and in the carrier mentioned and combine with the carrier to form a separator in the usual sense.

Preferably, in this embodiment of the invention, the capacitors according to the present invention comprise carriers which are flexible and preferably less than 50 µm in thickness. Carrier flexibility ensures separator flexibility as well. Such flexible separators are indispensable for example in wound capacitors according to the present invention.

Preferably, the capacitor according to the present invention comprises a separator having a carrier which is less than 30 µm and more preferably less than 20 µm in thickness. To be able to achieve sufficiently high performance capability, it has been determined to be advantageous for most applications for the separator according to the present invention to comprise a carrier whose porosity is preferably above 50%, more preferably in the range from 50% to 97%, even more preferably in the range from 60% to 90% and most preferably in the range from 70% to 90%. Porosity in this context is defined as the volume of the carrier (100%) minus the volume of the fibers of the carrier, i.e., the fraction of the volume of the carrier that is not taken up by material. The volume of the carrier can be calculated from the dimensions of the carrier. The volume of the fibers is calculated from the measured weight of the nonwoven in question and the density of the fibers and especially of the polymeric fibers. In a further embodiment of the invention, the carrier is a nonwoven having a pore size in the range from 5 to 500 µm and preferably in the range from 10 to 200 µm. It can be similarly advantageous for the carrier to have a pore radius distribution where at least 50% of the pores have a pore radius in the range from 75 to 150 µm.

The porous (perforate) carrier preferably comprises woven or non-woven polymeric or glass fibers. It is particularly preferable for the carrier to comprise a glass or polymeric woven or nonwoven or to be such a woven or nonwoven. The polymeric fibers in the carrier are preferably nonelectroconductive fibers of polymers which are preferably selected from polyacrylonitrile (PAN), polyesters, for example polyethylene terephthalate (PET), polyamide (PA) and/or polyolefin (PO), for example polypropylene (PP) or polyethylene (PE) or mixtures of such polyolefins. When the perforate carrier comprises polymeric fibers, however, polymeric fibers other than those mentioned above can be used as well, as long as they have the requisite thermal stability for the production of the separators and capacitors and also are stable under the operating conditions. In a preferred embodiment, the carrier according to the present invention comprises polymeric fibers having a softening temperature of above 100° C. and a melting temperature of above 110° C. The carrier may comprise fibers and/or filaments from 0.1 to 150 μm and preferably from 1 to 20 μm in diameter and/or threads from 3 to 150 μm and preferably from 10 to 70 μm in diameter. When the carrier comprises polymeric fibers, these are preferably from 0.1 to 10 μm and more preferably from 1 to 5 μm in diameter. Particularly preferred flexible nonwovens, especially polymeric nonwovens, have a basis weight of less than 20 g/m² and preferably in the range from 5 to 15 g/m². This ensures a particularly low thickness and high flexibility for the carrier.

It is particularly preferable for the capacitor according to the present invention to comprise a carrier which is a polymeric nonwoven which is less than 30 μm and preferably from 10 to 20 μm in thickness. A very homogeneous pore radius distribution in the nonwoven is particularly important for use in a separator according to the present invention. A very homogeneous pore radius distribution in the nonwoven leads in conjunction with optimally adapted oxidic particles of a certain size to an optimized porosity for the separator according to the present invention.

Depending on the intended use for the capacitor according to the present invention and especially depending on to the electrolyte/conducting salt system used, it can be advantageous to use carriers composed of certain polymeric fibers. When the capacitors or the separating layer are to be impregnated with an organic solvent, such as a carbonate or acetonitrile for example, the capacitor preferably comprises carriers which comprise or consist of fibers composed of polyethylene terephthalates (PETS) or polyamides (PAs). When the capacitors according to the present invention are impregnated with aqueous electrolyte systems which frequently comprise strongly alkaline or strongly acidic electrolytes, it has been determined to be advantageous for the carriers to comprise or consist of polymeric fibers composed of polyacrylonitrile.

The separators which are present in the capacitor according to the present invention as per this embodiment, which are formed of a separating layer and a carrier, are bendable without damage preferably down to any radius down to 100 m, preferably to a radius in the range from 100 m down to 50 mm and most preferably to a radius in the range from 50 mm down to 2 mm. These separators are also notable for a breaking strength of at least 1 N/cm, preferably at least 3 N/cm and most preferably above 6 N/cm. The high breaking strength and the good bendability of the separator according to the present invention has the advantage that the separator provides a simple way of manufacturing commercially standardized wound capacitors. In these cells, the electrode-separator plies are spirally wound up with each other in standardized size and contacted.

The separating layer present in this embodiment of the capacitor has a porosity which is preferably in the range from 30% to 70%. Porosity here refers to the accessible, i.e., open, pores. Porosity in this sense can be determined by the familiar method of mercury porosimetry or can be calculated from the volume and the density of the ingredients used on the assumption that open pores only are present. The separator present in the capacitor according to the present invention may have a thickness in the range from 10 to 1000 μm, preferably in the range from 10 to 100 μm and most preferably in the range from 10 to 50 μm. The separators are preferably less than 50 μm, more preferably less than 40 μm, even more preferably in the range from 5 to 30 μm and most preferably in the range from 15 to 25 μm in thickness. Separator thickness has a certain influence on the properties of the capacitor. Thin separators permit an increased pack density in a capacitor stack, so that a larger amount of energy can be stored in the same volume.

In a further preferred embodiment of the capacitor according to the present invention, the latter comprises as a carrier a porous electrode suitable for use as an electrode in a capacitor and forms a separator-electrode unit. More particularly, materials useful as electrodes are materials which are useful in double-layer capacitors or metal oxide capacitors. The separator-electrode unit comprises a porous electrode suitable for use as an electrode in a capacitor and a separating layer which has been applied to this electrode and which is characterized in that it comprises particles of the elements Al, Si and/or Zr which are adhered to each other and to the carrier by an inorganic adhesive. The inorganic adhesive may be for example a fraction of metal oxide particles which differ in their average particle size, preferably by a factor of more than 10 and/or in the metal, from the particles of the elements Al, Si and/or Zr. In a preferred embodiment of the invention, the two particle fractions comprise metal oxide particles which differ not only in the metal but also in their particle size. The inorganic separating layer, as well as the inorganic constituents, may comprise small amounts of organic and especially organosilicon compounds. But the proportion of these organic constituents in the inorganic separating layer is preferably less than 5% by weight, more preferably less than 1% by weight and more preferably less than 0.1% by weight. These silanes serve as adhesion promoters to obtain better bonding of the ceramic to the electrodes.

The two particle fractions in the separating layer, irrespective of whether they comprise oxides of the same or different metals as metal oxide, preferably comprise particles whose particle sizes differ by at least a factor of 10 and more preferably by at least a factor of 100. Preferably, the separator-electrode unit according to the present invention comprises a separating layer which comprises metal oxide particles having an average particle size ($D_g$) greater than the average pore size (d) of the pores of the porous electrode that are adhered by metal oxide particles which have a particle size ($D_k$) which is smaller than the pores of the porous electrode. The thickness (z) of the separating layer is preferably less than 100 $D_g$ and not less than 1.5 $D_g$ and more preferably less than 20 $D_g$ and not less than 5 $D_g$.

The metal oxide particles having an average particle size ($D_g$) greater than the average pore size (d) of the pores of the porous electrode are preferably $Al_2O_3$ and/or $ZrO_2$ particles. The metal oxide particles having an average particle size ($D_k$) less than the average pore size (d) of the pores of the porous electrode are preferably $SiO_2$ and/or $ZrO_2$ particles.

It is particularly preferable for the separator-electrode units according to the present invention to comprise metal oxide particles having an average particle size ($D_g$) greater than the average pore size (d) of the pores of the porous electrode an average particle size ($D_g$) of less than 10 μm, preferably less than 5 μm and most preferably less than 3 μm. A separating layer thickness of 5 $D_g$ will thus correspond to a separating layer thickness of about max. 15 μm for particles having an average particle size of 3 μm. Preferred layer thicknesses for the separating layer have thicknesses less than 25 μm and preferably from 10 to 15 μm. If necessary, however, separating layer thickness can also be less than 10 μm. The add-on weights are preferably in the range from 10 to 200 g/m², more preferably less than 100 g/m² and most preferably less than 50 g/m².

The separating layer of the separator-electrode unit of the capacitor according to the present invention preferably has a porosity in the range from 30% to 70% (determined by mercury porosimetry). Owing to the high porosity and the good wettability of the separating layer, the separator-electrode unit and the capacitor are readily impregnable and fillable, respectively, with electrolytes. Furthermore, thinner separator layers permit an increased pack density in a capacitor stack, so that a larger amount of energy can be stored in the same volume. The separator-electrode unit is therefore particularly useful for capacitors having an increased energy density.

The mechanical properties of the separator-electrode unit are essentially determined by the electrode because the separating layer is so thin. Typical tensile strengths lie in the range of the tensile strengths of the metallic carrier used for production. This tensile strength is about 10 N/cm in the case of expanded metals, depending on the expanded metal used, and more than 15 N/cm in the case of the use of metal foils. The separator-electrode unit can be executed to be flexible. Preferably, a separator-electrode unit according to the present invention is bendable down to a radius down to 100 m, preferably down to a radius in the range from 100 m down to 50 cm and more preferably down to a radius in the range from 50 cm down to 5, 4, 3, 2 or 1 mm.

The separator-electrode unit according to the present invention may comprise any conventional electrode which is useful in an electrochemical capacitor as positive or negative electrode. Preferably, the electrode in the separator-electrode unit according to the present invention is an electrode which is used in double-layer capacitors or metal oxide capacitors, which thus comprises activated carbon having a very large surface area, for example charcoal or $RuO_2$ or $IrO_2$ particles. Customarily, these compounds are combined with graphite or carbon black, a polymer of very high thermal stability, such as polyvinylidene fluoride, polyacrylic or polystyrene, for example, and a solvent to create pastes which are applied to a thin metal foil (as current collector), such as aluminum foil or copper foil for example, and solidified by solvent removal. Preferred electrodes have a very high porosity, preferably in the range from 20% to 40% (determined by Hg porosimetry) to provide a very large active surface area. What is particularly important here is not just a large specific surface area but also that the pores have a certain minimum size in order that they may be filled with electrolyte. Many small pores make a large contribution to the surface area, but are ineffective for the capacitor. The minimum size for active pores is about 5 nm. Particularly preferred electrodes have average pore sizes (d) in the range from 5 nm to 20 μm and preferably from 10 nm to 1 μm. Preference is given to multimodal pore distributions where there are many small pores but also some large pores. The metal foil may be coated either singly or else preferably bothsidedly. With either electrode, the separating layer may have been applied to either or both of the sides in the case of both sidedly coated current collectors, depending on the further construction of the capacitor.

A bothsided coating of at least one electrode with a separating layer additionally simplifies the construction of a wound module, since one of the separating layers can serve as a separator while the other layer constitutes the insulating layer which insulates the electrode from the counterelectrode which comes to lie above the electrode on winding.

In a particularly preferred embodiment, the capacitor according to the present invention comprises a separating layer which comprises at least two fractions of oxides selected from $Al_2O_3$, $ZrO_2$ and/or $SiO_2$, the first ceramic fraction having been obtained from a sol and the second fraction comprising particles having an average particle size in the range from 200 nm to 5 μm and the first fraction being present as a layer on the particles of the second fraction and the first fraction comprising from 1 to 30 parts by mass of the coating, the second fraction being present in the ceramic coating at from 5 to 94 parts by mass of the coating and there also being present a network comprising silicon, the silicon of the network being bonded via oxygen atoms to the oxides of the ceramic coating, via organic radicals to the polymeric nonwoven and via at least one chain which comprises carbon atoms to a further silicon. The chain which comprises carbon atoms preferably also comprises at least one nitrogen atom. Preferably, the separating layer according to the present invention comprises a network which comprises silicon and in which the chains by which the silicon atoms are connected to each other via carbon atoms, through silicon atoms connected by chains comprising nitrogen, was obtained by addition of an amino group onto a glycidyl group. Owing to these chains between the silicon atoms, there is not only an inorganic network formed via Si- or metal-oxygen bridges but also a second, organic network which is reticulated with the first, inorganic network and which significantly augments the stability of the membrane, especially against water.

In a further particularly preferred embodiment of the separating layer, the latter comprises at least three fractions of oxides selected from $Al_2O_3$, $ZrO_2$ and/or $SiO_2$, the third fraction comprising particles having an average primary particle size in the range from 10 nm to 199 nm and the first fraction being present as a layer on the particles of the second and third fractions and the first fraction comprising from 1 to 30 parts by mass of the ceramic coating, the second fraction comprising from 30 to 94 parts by mass of the ceramic coating and the third fraction comprising from 5 to 50 parts by mass of the ceramic coating.

In this preferred embodiment, the large particles (second fraction) serve as a filling material for the large meshes in the carrier. The first ceramic fraction serves as inorganic binder (inorganic adhesive) which fixes the particles to each other and also to the carrier (or, to be more specific, to the inorganic silicon network formed by the adhesion promoters). The inorganic network ensures particularly good adhesion of the ceramic coating to organic carriers, such as polymeric nonwovens for example. The particles of the third fraction, which have a particle size in the middle, are believed to be responsible for the particularly good flexibility.

It is particularly preferable for this embodiment of the capacitor according to the present invention to comprise a separating layer where the third fraction comprises particles having an average primary particle size in the range from 30 nm to 60 nm and the second fraction comprises particles having an average particle size in the range from 1 to 4 μm and the first fraction is present in the separating layer at a coating fraction in the range from 10 to 20 parts by mass, the third fraction is present in the separating layer at a coating fraction in the range from 10 to 30 parts by mass and the second fraction is present in the separating layer at a coating fraction in the range from 40 to 70 parts by mass.

It can be advantageous for the third particle fraction to contain particles which have an average aggregate or agglomerate size in the range from 1 to 25 μm. Preferably, the third (particle) fraction contains particles which have a BET surface area in the range from 10 to 1000 and preferably in the range from 40 to 100 $m^2/g$.

Particularly high flexibility can be achieved for the separating layer according to the present invention when the particles of the third fraction are zirconium oxide or preferably silicon oxide particles and the particles of the second fraction are aluminum oxide particles and the ceramic fraction is formed from silicon oxide. The medium-size particles (third fraction, such as Sipernat, Aerosil or VP Zirkoniumoxid, all Degussa AG) and large particles (second fraction, for example the aluminum oxides CT800SG, AlCoA, and MZS, Martinswerke) are commercially available particles. The first ceramic fraction comes from sols, which are likewise commercially available or have to be produced themselves.

Separating layers having a composition as mentioned above are bendable (if allowed by the carrier) without damage preferably down to any radius down to 50 m, preferably 10 cm and more preferably 5 mm without defects arising in the separating layer as a result.

The separators according to the present invention can obviously also be used in all conventional capacitors.

A further embodiment of a capacitor according to the present invention, which can be a conventional capacitor for example, may comprise a separator-electrode unit which comprises a nonporous polymeric film carrier onto which a metal layer is vapor deposited. The film can be for example a polyethylene terephthalate (PET) film. The metal used is aluminum for example. It is on this porous metal layer as carrier, which together with the polymeric film is preferably from 0.5 to 5 µm and more preferably from 1 to 2 µm in thickness, that the above-described ceramic coating is present in a layer thickness which is preferably less than 10 µm and more preferably less than 5 µm. The composition of the ceramic separating layer can correspond to that described above. The presence of the separating layer distinctly reduces the risk of capacitor breakdown compared with capacitors without such a layer.

The capacitor according to the present invention, as well as the electrodes and the separating layer, which are customarily accommodated in a housing and equipped with means for connecting up the capacitor, comprises a dielectric, such as for example air in the case of some conventional capacitors or an electrolyte, i.e., a system of solvent and conducting salt, in the case of an electrochemical capacitor. As well as known aqueous solvent/conducting salt systems, the capacitor according to the present invention may comprise in particular a nonaqueous electrolyte selected from propylene carbonate (PC), N,N-dimethylformamide (DMF), γ-butyrolactone (GBL), N-methyl-2-pyrrolidone (NMP) and acetonitrile (AN), and tetraalkylphosphonium or tetraalkylammonium salts, such as for example $R_4NBF_4$, $R_4NPF_6$, $R_4NClO_4$ or $R_4NCF_3SO_3$, where R=identical or different, substituted or unsubstituted alkyl, aryl, alkyl-aryl, aryl-alkyl or cycloalkyl groups, where any substituents present may be selected from primary, secondary or tertiary alkyl groups, alicyclic groups, aromatic groups, —N-dialkyl, —NHalkyl, —$NH_2$, fluorine, chlorine, bromine, iodine, —CN, —OH—C(O)-alkyl, —C(O)H or C(O)O-alkyl, —$CF_3$, —O-alkyl, —C(O)N-alkyl and/or —OC(O)-alkyl, as conducting salts. As described above, the separating layer or the carrier must be chosen according to the electrolyte to be used.

The capacitor according to the present invention can be produced in the same way as all prior art capacitors. The separating layer which is present in the capacitor according to the present invention on and/or in a porous carrier or on the carrier is obtainable for example by applying a suspension to the carrier and solidifying the suspension by at least single heating on and/or in the carrier, the suspension comprising a sol as inorganic adhesive and at least one fraction of oxidic particles selected from the oxides of the elements Al, Zr and/or Si.

Depending on whether the separating layer is to be applied to an electrode or to a carrier which is not suitable for use as an electrode, an appropriate carrier has to be used. A carrier which is not suitable for use as an electrode is preferably less than 30 µm, more preferably less than 20 µm and even more preferably from 10 to 20 µm in thickness. It is particularly preferable to use carriers as described in the preceding description of the capacitor according to the present invention. The porous carrier used thus preferably comprises woven or non-woven polymeric or glass fibers. It is particularly preferable for the carrier used to comprise a glass or polymeric woven or nonwoven or to be such a woven or nonwoven. Preferably, the carrier used comprises polymeric fibers having a softening temperature of above 100° C. and a melting temperature of above 110° C. It can be advantageous for the polymeric fibers to be from 0.1 to 10 µm and preferably from 1 to 5 µm in diameter. It is particularly preferable for the process according to the present invention to utilize a carrier which comprises fibers selected from polyacrylonitrile, polyester, polyamide and/or polyolefin.

When the carrier used is an electrode, any conventional electrode which is suitable for use as an electrode in a capacitor can be used. Such electrodes for electrochemical capacitors customarily comprise a metal foil current collector having, on either or both sides of the foil, an applied porous coating of an electroconductive material, such as $RuO_2$ or $IrO_2$ particles or activated carbon particles for example, which are conductively connected to each other and to the current collector by carbon black and graphite and a binder. For conventional capacitors, the electrodes comprise a metal layer on a polymeric film.

The production of ceramic coatings of the kind constituting the separating layers in capacitors according to the present invention is known in principle from WO 99/15262.

The separating layers according to the present invention are obtained by applying a suspension which inorganic non-electroconductive particles to a preferably porous electroconductive carrier (an electrode for example) or a nonelectroconductive carrier (polymeric nonwoven) and then solidifying the suspension to form an inorganic coating on and/or in the porous carrier. The suspension may be applied to the carrier by printing on, pressing on, pressing in, rolling on, knifecoating on, spreadcoating on, dipping, spraying or pouring on for example.

The suspension used for producing the coating comprises at least particles of $Al_2O_3$, $ZrO_2$ and/or $SiO_2$ and at least one sol of the elements Al, Zr and/or Si and is produced by suspending the particles in at least one of these sols. The suspending is effected by intensive mixing of the components. The average size of the particles used is preferably in the range from 0.5 to 10 µm and more preferably in the range from 1 to 5 µm. The metal oxide particles used for producing the suspension are more preferably aluminum oxide particles, which preferably have an average particle size in the range from 0.5 to 10 µm, and more preferably from 1 to 5 µm. Aluminum oxide particles in the range of the preferred particle sizes are available for example from Martinswerke under the designations MZS 3 and MZS 1 and from AlCoA under the designation CT3000 SG, CL3000 SG, CT1200 SG, CT800SG and HVA SG.

It has been determined that the use of commercially available oxidic particles leads to unsatisfactory results in certain circumstances, since the particle size distributions are frequently very wide. It is therefore preferable to use metal oxide particles which have been classified by a conventional process, for example wind sifting and hydroclassification. It is preferable to employ as oxidic particles those fractions where the coarse grain fraction, which accounts for up to 10% of the total amount, has been separated off by wet sieving. This unwelcome coarse grain fraction, which is very difficult or impossible to comminute even by the typical processes of suspension production such as, for example, grinding (ball mill, attritor mill, pestle mill), dispersing (Ultra-Turrax, ultrasound), trituration or chopping, can consist for example of aggregates, hard agglomerates, grinding media attritus. The aforementioned measures ensure that the inorganic porous layer has a very uniform pore size distribution. This is achieved in particular by using oxidic particles whose maximum particle size is preferably from $1/3$ to $1/5$ and more preferably not more than $1/10$ of the thickness of the carrier (nonwoven) used.

Table 2 hereinbelow gives an overview of how the choice of the various aluminum oxides affects the porosity and the resulting pore size of the respective porous inorganic separating layer. To determine these data, the corresponding slips (suspensions or dispersions) were prepared and dried and solidified as pure moldings at 200° C.

TABLE 2

Typical data of ceramics as a function of powder type used

| $Al_2O_3$ type | Porosity/% | Average pore size/nm |
|---|---|---|
| AlCoA CL3000SG | 51 | 755 |
| AlCoA CT800SG | 53.1 | 820 |
| AlCoA HVA SG | 53.3 | 865 |
| AlCoA CL4400FG | 44.8 | 1015 |
| Martinsw. DN 206 | 42.9 | 1025 |
| Martinsw. MDS 6 | 40.8 | 605 |
| Martinsw. MZS 1 + Martinsw. MZS 3 = 1:1 | 47% | 445 |
| Martinsw. MZS 3 | 48% | 690 |

By average pore size and the porosity are meant the average pore size and the porosity as may be determined by the known method of mercury porosimetry using for example a 4000 porosimeter from Carlo Erba Instruments. Mercury porosimetry is based on the Washburn equation (E. W. Washburn, "Note on a Method of Determining the Distribution of Pore Sizes in a Porous Material", *Proc. Natl. Acad. Sci.*, 7, 115-16 (1921)).

The mass fraction of the suspended component (particles) is preferably from 1 to 250 times and more preferably from 1 to 50 times the sol used.

The sols are obtained by hydrolyzing at least one (precursor) compound of the elements Zr, Al and/or Si. It can likewise be advantageous for the compound to be hydrolyzed to be introduced into alcohol or an acid or a combination thereof prior to hydrolysis. The compound to be hydrolyzed is preferably at least one nitrate, one chloride, one carbonate or one alkoxide compound of the elements Zr, Al and/or Si. The hydrolysis is preferably carried out in the presence of liquid water, water vapor, ice, alcohol or an acid or a combination thereof. Preferably, the sols are obtained by hydrolyzing a compound of the elements Al, Zr or Si using water or a an acid or a combination thereof, the compounds preferably being present dissolved in an anhydrous solvent and being hydrolyzed with from 0.1 to 100 times the molar ratio of water.

In one version of the process for producing the separating layer of the present invention, particulate sols are produced by hydrolysis of the compounds to be hydrolyzed. These particulate sols are so called because the compounds formed by hydrolysis in the sol are present in particulate form. Particulate sols can be prepared as described above or in WO 99/15262. These sols customarily have a very high water content, which is preferably above 50% by weight. It can be advantageous for the compound to be hydrolyzed to be introduced into alcohol or an acid or a combination thereof prior to hydrolysis. The hydrolyzed compound may be peptized by treatment with at least one organic or inorganic acid, preferably with a 10-60% organic or inorganic acid, more preferably with a mineral acid selected from sulfuric acid, hydrochloric acid, perchloric acid, phosphoric acid and nitric acid or a mixture thereof. The particulate sols thus produced can subsequently be used to produce suspensions, in which case it is preferable to produce suspensions for application to polymeric fiber nonwovens which have been pretreated with polymeric sol.

In a further version of the process for producing a separating layer according to the present invention, polymeric sols are produced by hydrolysis of the compounds to be hydrolyzed. These polymeric sols are so called because the compounds formed by hydrolysis in the sol are present in polymeric form, i.e., in the form of chains crosslinked across a relatively large space. Polymeric sols customarily contain less than 50% by weight, preferably very much less than 20% by weight, of water and/or aqueous acid. To obtain the preferred fraction of water and/or aqueous acid, the hydrolysis is preferably carried out in such a way that the compound to be hydrolyzed is hydrolyzed with from 0.5 to 10 times the molar ratio and preferably with half the molar ratio of liquid water, water vapor or ice, based on the hydrolyzable group, of hydrolyzable compound. The amount of water used can be up to 10 times in the case of compounds which are very slow to hydrolyze, such as tetraethoxysilane for example. Compounds which are very quick to hydrolyze, such as zirconium tetraethoxide, may well form particulate sols under these conditions, for which reason 0.5 times the amount of liquid water is preferably used to hydrolyze such compounds. A hydrolysis with less than the preferred amount of liquid water, water vapor or ice likewise leads to good results, although using more than 50% less than the preferred amount of half the molar ratio is possible but not very sensible, since hydrolysis would no longer be complete and coatings based on such sols would not be very stable.

To produce these sols having the desired very low fraction of water and/or acid in the sol, it may be preferable for the compound to be hydrolyzed to be dissolved in an organic solvent, especially ethanol, isopropanol, butanol, amyl alcohol, hexane, cyclohexane, ethyl acetate or mixtures thereof, before the actual hydrolysis is carried out. A sol thus produced can be used for producing the suspension of the present invention or as an adhesion promoter in a pretreatment step. It is particularly preferable to use a suspension for producing the inventive separating layer which comprises a polymeric sol of a compound of silicon.

Both particulate sols and polymeric sols are useful as a sol in the inventive process for preparing the suspension. As well as sols obtainable as just described, it is in principle also possible to use commercially available sols, for example zirconium nitrate sol or silica sol. The process for producing separating layers or separators by applying a suspension to, and solidifying it on, a carrier is known per se from DE 101 42 622 and in similar form from WO 99/15262, but not all the parameters and ingredients are applicable to the production of the separator used in the process according to the present invention. More particularly, the operation described in WO 99/15262 is in that form not fully applicable to polymeric nonwoven materials, since the very watery sol systems described therein frequently do not permit complete, in-depth wetting of the customarily hydrophobic polymeric nonwovens, since most polymeric nonwovens are only badly wetted by very watery sol systems, if at all. It has been determined that even the minutest unwetted areas in the nonwoven material can lead to membranes and separators being obtained that have defects (such as holes or cracks, for example) and hence are inutile.

It has been found that a sol system or suspension whose wetting behavior has been adapted to the polymers will completely penetrate the carrier materials and especially the nonwoven materials and so provide defect-free coatings. In the inventive process it is therefore preferable to adapt the wetting behavior of the sol or suspension. This is preferably accomplished by producing polymeric sols or suspensions from polymeric sols, these sols comprising one or more alcohols, for example, methanol, ethanol or propanol or mixtures thereof which also preferably comprise aliphatic hydrocarbons. But other solvent mixtures are conceivable as well for addition to the sol or suspension in order that the wetting behavior thereof may be adapted to the nonwoven (carrier) used.

To improve the adhesion of the inorganic components to polymeric fibers or nonwovens as carrier, it may be preferable for the suspensions used to be admixed with adhesion promoters, for example organofunctional silanes, for example the Degussa silanes GLYMO, MEMO, AMEO, VTEO or Silfin. The admixing of adhesion promoters is preferable in the case of suspensions based on polymeric sols. Useful adhesion promoters include especially compounds selected from the octylsilanes, the vinylsilanes, the amine-functionalized silanes and/or the glycidyl-functionalized silanes, for example the Dynasilanes from Degussa. Particularly preferred adhesion promoters are vinyl-, methyl- and octylsilanes for polyethylene (PE) and polypropylene (PP) (although the exclusive use of methylsilanes is not optimal), amine-functional silanes for polyamides and polyamines and glycidyl-functionalized silanes for polyacrylates, polyacrylonitrile and polyesters. Triethoxy(tridecafluoroochyl)silane, for inslaxe, is highly suitable for PVDF. Other adhesion promoters can be used as well, but they have to be adapted to the respective polymers. Adhesion promoters have to be chosen such that the solidification temperature is below the melting or softening temperature of the polymer used as a substrate and below the decomposition temperature of the polymer. The adhesion promoters used are especially the silanes listed in table 1. Preferably, suspensions according to the present invention contain very much less than 25% by weight and preferably less than 10% by weight of compounds capable of acting as adhesion promoters. An optimal fraction of adhesion promoter results from coating the fibers and/or particles with a monomolecular layer of adhesion promoter. The amount in grams of adhesion promoter required for this purpose can be obtained by multiplying the amount (in g) of the oxides or fibers used by the specific surface area of the materials (in $m^2g^{-1}$) and then dividing by the specific area required by the adhesion promoters (in $m^2g^{-1}$), the specific area required frequently being in the range from 300 to 400 $m^2g^{-1}$ in order of magnitude.

Table 2 below contains an illustrative selection of preferred adhesion promoters based on organofunctional silicon compounds for typical polymers used as a nonwoven material.

TABLE 2

| Polymer | Organofunctional type | Adhesion promoter |
| --- | --- | --- |
| PAN | Glycidyl | GLYMO |
|  | methacryloyl | MEMO |
| PA | Amino | AMEO, DAMO |
| PET | methacryloyl | MEMO |

TABLE 2-continued

| Polymer | Organofunctional type | Adhesion promoter |
| --- | --- | --- |
|  | vinyl | VTMO, VTEO, VTMOEO |
| PE, PP | amino | AMEO, AMMO |
|  | vinyl | VTMO, VTEO, Silfin |
|  | methacryloyl | MEMO | where:
AMEO = 3-aminopropyltriethoxysilane
DAMO = 2-aminoethyl-3-aminopropyltrimethoxysilane
GLYMO = 3-glycidyloxytrimethoxysilane
MEMO = 3-methacryloyloxypropyltrimethoxysilane
Silfin = vinylsilane + initiator + catalyst
VTEO = vinyltriethoxysilane
VTMO = vinyltrimethoxysilane
VTMOEO = vinyltris(2-methoxyethoxy)silane The suspension present on and/or in the carrier as a result of having been applied thereto (the coating) can be solidified by heating to a temperature in the range from 50 to 350° C. for example. Since, when polymeric substrate materials are used, the maximum allowable temperature is dictated by the carrier material, the maximum allowable temperature has to be adapted accordingly so that the carrier material does not melt or soften. Thus, depending on the embodiment of the process, the suspension present on and in the carrier is solidified by heating at from 100 to 350° C. and most preferably by heating at from 200 to 280° C. It may be preferable for the heating to take place at from 150 to 350° C. for from 1 second to 60 minutes. It is particularly preferable to solidify the suspension by heating at from 110 to 300° C. and most preferably at from 170 to 280° C. and preferably for from 0.5 to 10 min. Heating the suspension preferably takes from 0.5 to 10 minutes at from 200 to 220° C. on a polymeric nonwoven comprising fibers composed of polyester, and from 0.5 to 10 minutes at from 170 to 200° C. on a polymeric nonwoven comprising fibers composed of polyamide. The heating of the assembly may be effected by means of heated air, hot air, infrared radiation or by other heating methods according to the prior art.

The process for producing separating layers according to the present invention can be carried out for example by unrolling the carrier off a reel, passing it at a speed in the range from 1 m/h to 2 m/s, preferably at a speed in the range from 0.5 m/min to 20 m/min and most preferably at a speed in the range from 1 m/min to 5 m/min through at least one apparatus which applies the suspension onto and into the carrier, such as a roll for example, and at least one further apparatus which enables the suspension to be solidified on and in the carrier by heating, for example an electrically heated oven, and rolling the carrier which has been provided with a separating layer up on a second reel. This makes it possible to produce the separating layer in a continuous process. Similarly, the pretreatment steps can be carried out as a continuous process while retaining the parameters mentioned.

In a further preferred embodiment of the inventive process for producing the separating layer by at least single heating of a suspension on and in the carrier, especially polymeric nonwoven, is solidified, the suspension comprising a sol and at least one fraction of oxidic particles selected from the oxides of the elements Al, Zr, Ti and/or Si, is notable in that the suspension has added to it prior to application a mixture of at least two different adhesion promoters which are each based on an alkylalkoxysilane of the general formula I $$R_x\text{—Si(OR)}_{4-x}$$ (I)

where x=1 or 2 and R=organic radical, the radicals R being the same or different, the adhesion promoters being selected so that both the adhesion promoters comprise alkyl radicals which at least each comprises a reactive group as a substituent, the reactive group on the alkyl radical of one adhesion promoter reacting with the reactive group of the other adhesion promoter during the at least single heating to form a covalent bond, or one or more adhesion promoters as per the formula I, which have reactive groups which are capable of reacting under the action of UV radiation to form a covalent bond, the addition of an adhesion promoter which reacts under the action of UV radiation being followed by one or more treatments with UV radiation after the suspension has been applied to the polymeric nonwoven (carrier). The treatment with UV radiation can be effected for example by means of a UV lamp, in which case the amount of energy received has to be sufficient to ensure crosslinking of the adhesion promoters. Good results are obtained for example by treatment with a mercury vapor lamp for a period in the range from 0.1 to 24 hours and preferably in the range from 1 to 4 hours. The treatment with UV radiation may be carried out before or after the at least single heating. Preferably, the UV treatment is carried out after the suspension has been applied to the polymeric nonwoven (carrier) and before the single heating of the suspension.

The use of at least two of the adhesion promoters mentioned is believed to lead to the formation, during the production of the separating layer, of a network which comprises silicon, the silicon of the network being bonded via oxygen atoms to the oxides of the ceramic coating, via organic radicals to the polymeric nonwoven (carrier) and via at least one chain comprising carbon atoms to a further silicon. It is believed that the same effect is achieved through an at least single treatment with UV radiation when a UV-active adhesion promoter is added to the suspension. Owing to the chains between the silicon atoms, there is not only an inorganic network, formed via Si- or metal-oxygen bridges, but also a second, organic network which is reticulated with the first, inorganic network and which significantly augments the stability of the separating layer, especially against water.

Useful adhesion promoters include in principle all adhesion promoters which satisfy the abovementioned formula I and where at least two adhesion promoters each have an alkyl radical which is capable of entering into a chemical reaction with the alkyl radical of the other adhesion promoter to form a covalent bond. In principle, all chemical reactions are feasible, but an addition or condensation reaction is preferable. The adhesion promoters may each have two or one alkyl radical (x in formula I being 1 or 2). Preferably, the adhesion promoters used in the process according to the present invention which have a reactive group on the alkyl radical have only one alkyl radical (x=1). The at least two adhesion promoters employed in the process of the present invention can be for example an adhesion promoter having an amino group on the alkyl radical and an adhesion promoter having a glycidyl group on the alkyl radical. It is particularly preferable for the process of the present invention to employ 3-aminopropyltriethoxysilane (AMEO) and 3-glycidyloxytrimethoxysilane (GLYMO) as adhesion promoters. Preferably, the molar ratio of the two adhesion promoters to each other is in the range from 100:1 to 1:100 and preferably in the range from 2:1 to 1:2 and most preferably about 1:1. Methacryloyloxypropyltrimethoxysilane (MEMO) is preferably used as a UV-active adhesion promoter which is capable of forming a covalent bond between the adhesion promoter molecules under the action of UV radiation. The adhesion promoters are available from Degussa AG for example.

To obtain a sufficiently stable network, the suspension of the present invention preferably comprises an adhesion promoter fraction in the range from 0.1 to 20 mass % and preferably in the range from 2 to 10 mass %. As well as the "reactive" adhesion promoters mentioned, the suspension may comprise further adhesion promoters selected from the organofunctional silanes mentioned above. These adhesion promoters can likewise be present in the suspension at a fraction in the range from 0.1 to 20 mass % and preferably at a fraction in the range from 2 to 10 mass %.

A further preferred embodiment of the process according to the present invention utilizes a suspension which comprises a sol and at least two fractions of oxidic particles selected from the oxides of the elements Al, Zr, Ti and/or Si and at least one first fraction comprises primary particles having an average particle size in the range from 200 nm to 5 µm and from 30 to 94 parts by mass of the suspension and at least one second fraction comprises an average primary particle size in the range from 10 nm to 199 nm and from 5 to 50 parts by mass of the suspension. Additionally, the suspension may in turn comprise adhesion promoters, including especially the abovementioned reactive adhesion promoters. The particles of the first fraction are preferably aluminum oxide particles and are offered for example by Martinswerke under the designations MZS 3 and MZS1 and by AlCoA under the designation CT3000 SG, CL3000 SG, CT1200 SG, CT800SG and HVA SG. Aluminum oxide, silicon oxide and zirconium oxide particles of the second fraction are offered for example by Degussa AG under the designations Sipernat, Aerosil, Aerosil P25 or Zirkoniumoxid VP.

It is particularly preferable to use suspensions where the mass fraction of the suspended component (second and third particle fractions) is from 1.5 to 250 times and more preferably from 5 to 20 times the employed first fraction from the sol.

When an electrode is coated as a carrier using the process according to the present invention, it will be advantageous for the separating layer not to be present in the electrode which is used as a carrier. To ensure this, it will be advantageous for the suspension used to preferably comprise metal oxide particles having an average particle size ($D_g$) greater than the average pore size (d) of the pores of the porous electrode. The metal oxide particles or the metal oxide particles having an average particle size ($D_g$) greater than the average pore size (d) of the pores of the porous electrode that are used for preparing the suspension are preferably $Al_2O_3$ and/or $ZrO_2$ particles. It is particularly preferable for the particles used as metal oxide particles to have an average particle size of less than 10 µm, preferably less than 5 µm and most preferably less than 3 µm.

To use a suspension having particles which are smaller than the average pore size of the pores of the electrode, it may be necessary to adjust the viscosity of the suspension. An appropriately high suspension viscosity will absent external shearing forces prevent penetration of the suspension into the pores of the electrode used as a carrier (structural viscosity, non-newtonian behavior). Such a behavior can be achieved through addition of auxiliaries that influence the flow behavior. Suspension viscosity is likewise preferably adjusted using inorganic materials as auxiliaries. It is particularly preferable to add pyrogenic silicas, for example Aerosils from Degussa AG, for example Aerosil 200, to the suspension to adjust suspension viscosity. Since these substances are very effective when used as auxiliaries to adjust the viscosity, it is sufficient for the silica mass fraction of the suspension to be in the range from 0.1% to 10% by weight and preferably from 0.5% to 5% by weight.

The thus produced carrier with separating layer may be used (depending on the carrier material used) as a separator or as a separator-electrode unit together with other components which are necessary for a capacitor as per the prior art to assemble a capacitor. When the capacitor thus produced is an electrochemical capacitor, the separating layer between the electrodes additionally has to be filled with the electrolyte system before the capacitor housing can be sealed.

The thus produced capacitors according to the present invention can be used as stores for electric energy in vehicles, electrovehicles, in starter modules for engines, especially diesel assemblies, disruptionless power supplies and in any technical appliance in which very large electric power outputs are required for short periods only.

The examples which follow describe the present invention without the scope of the claims and the description being restricted by the examples.

EXAMPLES

Example 1

Inventive Separator S450P

To 130 g of water and 15 g of ethanol were initially added 30 g of a 5% by weight aqueous $HNO_3$ solution, 10 g of tetraethoxysilane, 2.5 g of methyltriethoxysilane and 7.5 g of GLYMO Dynasilane. This sol, which was initially stirred for some hours, was only used to suspend 125 g each of the aluminum oxides Martoxid MZS-1 and Martoxid MZS-3. This slip was homogenized with a magnetic stirrer for at least a further 24 h, during which the stirred vessel had to be covered over in order that no solvent loss occurred.

The above slip was then used to coat a 20 cm wide PET nonwoven having a thickness of about 20 µm and a basis weight of about 15 g/m2 in a continuous roll coating process at a belt speed of about 30 m/h and T=200° C. where the slip is rolled onto the nonwoven by a roll which turns in the direction opposite to the belt direction (and direction of movement of the nonwoven). The nonwoven subsequently passes through an oven 1 m in length which has the stated temperature. The same method and arrangement for coating is used in the runs which follow. The end result obtained is a separator having an average pore size of about 450 nm and 35 µm thickness.

Example 2

Inventive Capacitor

A copper foil 165 mm in width is coated over 160 mm width with a dispersion of 10 g of highly activated carbon (1200 $m^2$/g, obtained as per BET method, as described in Winnacker-Küchler (3.) 7, 93f. Z. Anal. Chem. 238, 187-193 (1968)) and 1 g of PVDF in 89 g of NMP continuously by means of the roll coating process known from Example 1 (belt speed about 30 m/h, T=150° C.). This material is used as an electrode hereinafter.

The separator as per Example 1 is initially trimmed to a width of about 165 mm and then processed together with two electrodes to form a coil having about 150 windings (electrode pairs with respectively 2 separator plies). The coil is inserted into an aluminum housing 50 mm in diameter and 172 mm in height, electrically connected to the external terminals and filled up with the electrolyte (concentrated solution of tetraethylammonium borofluoride in acetonitrile).

The capacitor will have a weight of about 400 g, a capacity of about 1850 farads at a voltage of 2.5 V. The maximum current is 450 A.

Example 3

Inventive Separator-Electrode Unit

A copper foil 165 mm in width is coated over 160 mm width with a dispersion of 10 g of highly activated carbon (1200 $m^2$/g, determined as per BET method and 1 g of PVDF in 89 g of NMP continuously by means of the roll coating process known from Example 1 (belt speed about 30 m/h, T=150° C.). The coating is effected concurrently on both sides.

To 130 g of water and 15 g of ethanol were initially added 30 g of a 5% by weight aqueous $HNO_3$ solution, 10 g of GLYMO Dynasilane and 10 g of GLYMO Dynasilane. This sol, which was initially stirred for some hours, was then used to suspend 200 g of CT1200SG aluminum oxide. This slip was homogenized with a magnetic stirrer for at least a further 24 h, during which the stirred vessel had to be covered over in order that no solvent loss occurred.

This electrode is coated with this slip in a second step on one side only over a width of 162 mm using the known roll coating process (belt speed about 60 m/h, T=180° C.).

Example 4

Inventive Capacitor

Two separator-electrode units consisting of an electrode as per Example 3, endowed with a separator layer on one side, are processed into a coil, care being taken to ensure that the electrodes are cleanly separated from each other at all times by a ceramic separator layer. This coil is inserted into an aluminum housing 60 mm in diameter and 172 mm in height, electrically connected to the outer terminals and filled up with the electrolyte (concentrated solution of tetraethylammonium borofluoride in acetonitrile).

The capacitor will have a weight of about 525 g, a capacity of about 2700 farads at a voltage of 2.5 V. The maximum current is 600 A.

What is claimed is:

1. A capacitor comprising:
    a separating layer,
    wherein the separating layer is present on a carrier and is adhered thereto and is a porous inorganic nonelectroconductive coating which comprises particles of compounds of the elements Al, Si and/or Zr that are adhered to each other and to the carrier by an inorganic adhesive, and
    wherein the carrier is an electrode configured for use as an electrode in a capacitor.

2. A capacitor according to claim 1, wherein the carrier is a porous electrode configured for use as an electrode in a capacitor.

3. A capacitor according to claim 1, wherein the particles comprise metal oxide particles having an average particle size greater than the average pore size of the pores of the electrode that are adhered together by the inorganic adhesive which comprises metal oxide particles which have a particle size which is smaller than the pores of the porous electrode.

4. A capacitor according to claim 3, wherein the metal oxide particles having an average particle size greater than the average pore size of the pores of the porous electrode are $Al_2O_3$ and/or $ZrO_2$ particles.

5. A capacitor according to claim 3, wherein the metal oxide particles having an average particle size less than the average pore size of the pores of the porous electrode are $SiO_2$ and/or $ZrO_2$ particles.

6. A capacitor according to claim 3, wherein the metal oxide particles having an average particle size greater than the average pore size of the pores of the porous electrode have an average particle size of less than 10 μm.

7. A capacitor according to claim 1, wherein the separating layer has a thickness of less than 100 $D_g$ and not less than 1.5 $D_g$, wherein $D_g$ is the average particle size of the particles.

8. A capacitor according to claim 7, wherein the separating layer has a thickness of less than 20 $D_g$ and not less than 5 $D_g$.

9. A capacitor according to claim 1, wherein the separating layer has a porosity in a range from 30% to 70%.

10. A capacitor according to claim 1, wherein the inorganic adhesive is selected from oxides of the elements Al, Si and/or Zr.

11. A capacitor according to claim 1, wherein the inorganic adhesive comprises particles having an average particle size of less than 20 nm and was produced via a particulate sol or comprises an inorganic network of the oxides which was produced via a polymeric sol.

12. A capacitor according to claim 1, wherein the adhered particles of the compounds of the elements Al, Si and/or Zr that are present in the separator have an average particle size in a range from 0.5 to 10 μm.

13. A capacitor according to claim 1, wherein the capacitor comprises a nonaqueous electrolyte selected from propylene carbonate, N,N-dimethylformamide, γ-butyrolactone and acetonitrile as solvent and also tetraalkylphosphonium or tetraalkylammonium salts as conducting salts.

14. A capacitor according to claim 1, wherein the separating layer is obtainable by applying a suspension to the carrier and solidifying the suspension on and in the carrier by at least single heating, the suspension comprising a sol as inorganic adhesive and at least one fraction of oxidic particles selected from the oxides of the elements Al, Zr and/or Si.

15. A capacitor according to claim 14, wherein the suspension is heated on the carrier at a temperature in the range from 170 to 280° C. for from 0.5 to 10 minutes.

16. A method comprising storing electrical energy in a vehicle with the capacitor according to claim 1.

* * * * *